(12) United States Patent
Pan (10) Patent No.: US 12,284,998 B1
(45) Date of Patent: Apr. 29, 2025

(54) MOSQUITO KILLER (71) Applicant: Huiliang Pan, Huangshi (CN)

(72) Inventor: Huiliang Pan, Huangshi (CN)

( * ) Notice: Subject to any disclaimer, the term of this patent is extended or adjusted under 35 U.S.C. 154(b) by 0 days.

(21) Appl. No.: 18/793,762

(22) Filed: Aug. 3, 2024

(30) Foreign Application Priority Data

Jul. 24, 2024 (CN) .......................... 202421772596.2

(51) Int. Cl.
*A01M 1/04* (2006.01)
*A01M 1/14* (2006.01)
*A01M 1/16* (2006.01)

(52) U.S. Cl.
CPC .............. *A01M 1/16* (2013.01); *A01M 1/145* (2013.01)

(58) Field of Classification Search
CPC ........... A01M 1/14; A01M 1/145; A01M 1/16
USPC .................................................... 43/113–117
See application file for complete search history.

(56) References Cited

U.S. PATENT DOCUMENTS

| | | | | | |
|---|---|---|---|---|---|
| 485,815 | A | * | 11/1892 | Koecher | A01M 1/14 43/114 |
| 904,668 | A | * | 11/1908 | Arents | A01M 1/165 118/419 |
| 1,239,148 | A | * | 9/1917 | Wende | A01M 1/14 5/601 |
| 2,249,718 | A | * | 7/1941 | Griness | A01M 1/14 43/116 |
| 2,873,551 | A | * | 2/1959 | Misko | A01M 1/2011 43/111 |
| 3,148,398 | A | * | 9/1964 | Thomas, Jr. | A47L 25/005 15/230 |
| 4,052,811 | A | * | 10/1977 | Shuster | A01M 3/04 43/136 |
| 4,074,457 | A | * | 2/1978 | Sato | A01M 1/145 43/113 |
| 5,425,197 | A | * | 6/1995 | Smith | A01M 1/14 43/113 |
| 5,454,186 | A | * | 10/1995 | Gang | A01M 1/02 43/114 |
| 5,634,292 | A | * | 6/1997 | Kitterman | A01M 1/02 43/115 |
| 5,651,211 | A | * | 7/1997 | Regan | A01M 1/145 43/116 |

(Continued)

FOREIGN PATENT DOCUMENTS

CN 2196873 Y * 5/1995
CN 2710365 Y * 7/2005

(Continued)

*Primary Examiner* — Darren W Ark
(74) *Attorney, Agent, or Firm* — Daniel M. Cohn; Howard M. Cohn (57) ABSTRACT

The present disclosure provides a mosquito killer, comprising: a base and a mosquito catching sheet supported on the base, wherein: the mosquito catching sheet comprises a lining sheet supported on the base and a mosquito sticky paper laid on the outer side of at least one plate surface of the lining sheet, the outer surface of the mosquito sticky paper is coated with mosquito sticky glue, the base is also provided with an accommodation cavity, one end of the mosquito sticky paper is rolled into a tube shape and accommodated in the accommodating cavity, while the opposite end extends along the plate surface of the lining sheet and is fixed to the top end of the lining sheet.

9 Claims, 7 Drawing Sheets (56) References Cited

U.S. PATENT DOCUMENTS

| | | | | |
|---|---|---|---|---|
| 6,871,443 B2* | 3/2005 | Lambert | ............... | A01M 1/145 43/113 |
| 7,036,268 B2* | 5/2006 | Taylor | ................. | A01M 1/145 43/113 |
| 7,143,542 B2* | 12/2006 | Taylor | ................. | A01M 1/145 43/113 |
| 7,784,215 B2* | 8/2010 | Cohnstaedt | ............. | A01M 1/04 362/231 |
| 8,151,515 B2* | 4/2012 | Crouse | .................... | A01M 3/04 43/132.1 |
| 8,341,874 B2* | 1/2013 | Studer | ................... | A01M 1/145 43/115 |
| 8,739,461 B2* | 6/2014 | Studer | ................... | A01M 1/145 43/115 |
| 8,935,877 B2* | 1/2015 | Gotschi | ................. | A01M 3/04 43/134 |
| 10,143,191 B2* | 12/2018 | Studer | ................... | A01M 1/145 |
| 10,327,435 B2* | 6/2019 | Studer | ................... | A01M 1/145 |
| 10,973,217 B2* | 4/2021 | Studer | ................... | A01M 1/145 |
| 11,684,057 B2* | 6/2023 | Ali | ........................ | A01M 1/12 43/111 |
| 2001/0042337 A1* | 11/2001 | Lambert | ............... | A01M 1/145 43/113 |
| 2003/0154644 A1* | 8/2003 | Lambert | ............... | A01M 1/145 43/107 |
| 2004/0218380 A1* | 11/2004 | Taylor | ................... | A01M 1/145 362/253 |
| 2007/0169401 A1* | 7/2007 | Chyun | .................. | A01M 1/145 43/107 |
| 2009/0038207 A1* | 2/2009 | Lin | ......................... | A01M 1/04 43/112 |
| 2011/0283597 A1* | 11/2011 | Coventry | ............... | A01M 1/08 43/107 |
| 2015/0320028 A1* | 11/2015 | Dayan | ..................... | A01M 1/04 43/112 |
| 2017/0086448 A1* | 3/2017 | Studer | ................... | A01M 1/145 |
| 2017/0112116 A1* | 4/2017 | Ji | .......................... | A01M 1/026 |
| 2018/0310543 A1* | 11/2018 | Holmes | ................. | A01M 1/106 |
| 2019/0075774 A1* | 3/2019 | Best | ........................ | A01M 1/04 |
| 2019/0075776 A1* | 3/2019 | Ali | ........................ | A01M 1/145 |
| 2019/0090470 A1* | 3/2019 | Lee | ......................... | A01M 1/04 |
| 2020/0138003 A1* | 5/2020 | Shoemaker, Jr. | ... | G09F 13/0413 |
| 2020/0260713 A1* | 8/2020 | Parnell | ................ | A01M 1/145 |
| 2021/0352885 A1* | 11/2021 | Fish | ....................... | A01M 1/106 |
| 2021/0368763 A1* | 12/2021 | Fish | ....................... | A01M 1/14 |
| 2022/0039366 A1* | 2/2022 | Parnell | ................ | A01M 1/145 |

FOREIGN PATENT DOCUMENTS

| | | | | |
|---|---|---|---|---|
| CN | 201107993 Y | * | 9/2008 | |
| CN | 212035570 U | * | 12/2020 | |
| CN | 212035593 U | * | 12/2020 | |
| CN | 212116778 U | * | 12/2020 | |
| CN | 212116792 U | * | 12/2020 | |
| CN | 212971335 U | * | 4/2021 | |
| CN | 213215012 U | * | 5/2021 | |
| CN | 113331151 A | * | 9/2021 | |
| CN | 113925033 A | * | 1/2022 | |
| CN | 215582981 U | * | 1/2022 | |
| CN | 215836672 U | * | 2/2022 | |
| CN | 114467877 A | * | 5/2022 | |
| CN | 216961241 U | * | 7/2022 | |
| CN | 115191412 A | * | 10/2022 | ............. A01M 1/02 |
| JP | 2008092804 A | * | 4/2008 | |
| KR | 20210067794 A | * | 6/2021 | |
| KR | 20210135774 A | * | 11/2021 | |
| WO | WO-2016004547 A1 | * | 1/2016 | ............. A01M 1/04 |

* cited by examiner

MOSQUITO KILLER

TECHNICAL FIELD

The present disclosure relates to a technical field of household appliances, and in particular to a mosquito killer.

BACKGROUND

The mosquito killer generally comprises a base and a mosquito catching sheet supported on the base, and at least one side of the mosquito catching sheet is coated with mosquito sticky glue. In actual use, place the mosquito killer in a place where mosquitoes are relatively rampant, and use the mosquito sticky glue to catch the surrounding mosquitoes to achieve the effect of killing mosquitoes.

Since the area of the mosquito catching sheet is limited, after a period of use, the mosquito catching sheet surface will be covered with mosquitoes and the mosquito catching sheet needs to be replaced. As a disposable consumable, the mosquito sheet is not environmentally friendly. An existing mosquito killer realizes the reuse of the mosquito catching sheet by scraping off the mosquito sticky glue that is full of mosquitoes and then applying new mosquito sticky glue, but there is still inconvenience in use.

SUMMARY

The present disclosure provides a mosquito killer that can reuse the lining sheet of the mosquito catching sheet and quickly replace the mosquito sticky glue.

In order to realize the above purpose, the present disclosure provides a mosquito killer, comprising: a base and a mosquito catching sheet supported on the base, wherein: the mosquito catching sheet comprises a lining sheet supported on the base and a mosquito sticky paper laid on the outer side of at least one plate surface of the lining sheet, the outer surface of the mosquito sticky paper is coated with mosquito sticky glue, the base is also provided with an accommodating cavity, one end of the mosquito sticky paper is rolled into a tube shape and accommodated in the accommodating cavity, while the opposite end extends along the plate surface of the lining sheet and is fixed to the top end of the lining sheet.

Furthermore, the accommodating cavity is pivotally provided with a roller, one end of the mosquito sticky paper is coiled and fixed on the roller, one end of the roller is pivotally connected to the inner wall of the accommodating cavity and the other end is transmission-connected to an operating knob, the accommodating cavity corresponding to the operating knob is provided with a pivot hole, the operating knob is pivotally connected in the pivot hole and protrudes out of a transmission shaft toward the accommodating cavity to be transmission-connected with the roller.

Furthermore, the inner wall of the pivot hole is provided with tooth grooves along the circumferential direction, the operating knob comprises a side plate with one side protruding out of the transmission shaft toward the roller and a cover plate fixed by butt-fastening to the side plate, the cover plate is provided with a mounting groove on one side facing the side plate, the end of the mounting groove is provided with an opening, and a clamping block with clamping tooth formed at the end is assembled in the mounting groove accordingly, and the end of the clamping block away from the clamping tooth is elastically connected to the groove wall of the mounting groove through an elastic member, while the clamping tooth extends through the opening to the outside of the cover plate and meshes with the tooth grooves to relatively fix the roller in the circumferential direction, and the corresponding external force drives the clamping tooth to press against the tooth grooves and exerts pressure on the elastic member in the opposite direction, the elastic member is elastically contracted by the force, thereby driving the clamping tooth to withdraw from the tooth grooves and pass over the tooth grooves one by one, thereby driving the roller to rotate.

Furthermore, the mosquito killer also comprises a fixing strip fixed to the top of the lining sheet away from the base, the fixing strip comprises a top plate arranged opposite to the top of the lining sheet and two guard plates extending from both side edges of the top plate toward the base, the end of the mosquito sticky paper extends and passes over the top of the lining sheet, and the top plate and the guard plates on both sides are respectively pressed and fixed to the mosquito sticky paper from three directions.

Furthermore, the top plate is also provided with a sliding groove along its length direction, and a paper cutting blade is slidably connected in the sliding groove, the paper cutting blade moves along the sliding groove to cut the mosquito sticky paper accordingly.

Furthermore, one side of the top end of the lining sheet is provided with a positioning sheet, the fixing strip extends out of an end plate corresponding to the positioning sheet, the end plate is provided with a positioning clip groove corresponding to the positioning sheet, by inserting the positioning sheet into the positioning clip groove, the installation position of the fixing strip can be located on the lining sheet.

Furthermore, the positioning sheet is also provided with a positioning protrusion, the groove wall of the positioning clip groove is correspondingly provided with a positioning hole, by inserting the positioning protrusion into the positioning hole, the positioning sheet can relatively fix the fixing strip and the lining sheet.

Furthermore, the top of the lining sheet away from the positioning sheet is provided with a through hole, one of the guard plates on both sides is provided with an alignment hole corresponding to the through hole, and the other is provided with a locking hole corresponding to the through hole, and a latch passes through the alignment hole and the through hole in sequence and is inserted and fixed into the locking hole to lock the lining sheet and the fixing strip.

Furthermore, the bottom end of the lining sheet protrudes out from a plug column on the side away from the accommodating cavity, the base is provided with a plug hole corresponding to the plug column, the lining sheet is supported on the base by inserting the plug column into the plug hole, the lining sheet near its bottom end is provided with a long groove hole for the mosquito sticky paper to pass through, and a hollow hole is provided in the middle.

Furthermore, the side of the base away from the accommodating cavity is also provided with a light source assembly, the light source assembly comprises a power module, a control circuit board connected to the power module and a light source assembled on the control circuit board.

After adopting the above technical solutions, the mosquito killer provided by the present disclosure has beneficial effects as follows:

The present disclosure adopts the lining sheet supported on the base with a roll of mosquito sticky paper to form the mosquito catching sheet, by pulling on one end of the mosquito sticky paper, the mosquito sticky paper is extended along the plate surface of the lining sheet and fixed to the top of the lining sheet. The surface of the mosquito sticky paper exposed to the outside space is coated with the mosquito sticky glue, which can effectively catch mosquitoes, and when the mosquito sticky glue needs to be replaced, the mosquito sticky paper in the accommodating cavity can be reversed by further pulling the mosquito sticky paper to release the unused mosquito sticky paper, and then the mosquito sticky paper can be extended and laid out along the plate surface of the lining sheet again and fixed the mosquito sticky paper again, so that the mosquito sticky glue can be replaced. The lining sheet can be reused and the mosquito sticky glue can be quickly replaced, which is economical and environmentally friendly.

BRIEF DESCRIPTION OF DRAWINGS

In order to more clearly illustrate technical solutions in embodiments of the present disclosure, drawings required in description or prior art are briefly introduced below, and obviously, the drawings in the following description are merely some embodiments of the present disclosure. For a person having ordinary skill in art, other drawings may be obtained according to the drawings without creative efforts.

REFERENCE NUMBER IN THE DRAWINGS

| | | | |
|---|---|---|---|
| base | 1 | accommodating cavity | 10 |
| pivot hole | 101 | tooth groove | 103 |
| roller | 12 | light source assembly | 14 |
| power module | 141 | control circuit board | 143 |
| light source | 145 | plug hole | 16 |
| mosquito catching sheet | 2 | lining sheet | 21 |
| positioning sheet | 210 | positioning protrusion | 2101 |
| through hole | 212 | plug column | 214 |
| long groove hole | 216 | hollow hole | 218 |
| mosquito sticky paper | 23 | operating knob | 3 |
| transmission shaft | 30 | side plate | 32 |
| cover plate | 34 | mounting groove | 341 |
| opening | 3410 | blade holder | 50 |
| operating portion | 345 | clamping block | 36 |
| clamping tooth | 361 | elastic member | 38 |
| fixing strip | 4 | top plate | 41 |
| sliding groove | 410 | sliding rail | 412 |
| guard plate | 43 | alignment hole | 430 |
| locking hole | 432 | end plate | 45 |
| positioning clip groove | 450 | positioning hole | 4501 |
| latch | 47 | paper cutting blade | 5 |

DETAILED DESCRIPTION

The following describes in detail the embodiments of the present disclosure, examples of which are illustrated in the accompanying drawings, wherein the same or similar reference numerals refer to the same or similar elements or elements having the same or similar functions throughout. The embodiments described below with reference to the accompanying drawings are exemplary, and are not intended to limit the present disclosure.

In order to make the purpose, technical solutions, and advantages of the present disclosure clear, the following further describes the present disclosure in detail with reference to accompanying drawings and embodiments.

Referring to FIG. 1 to FIG. 7, the present disclosure provides a mosquito killer, comprising: a base 1 and a mosquito catching sheet 2 supported on the base 1, wherein: the mosquito catching sheet 2 comprises a lining sheet 21 supported on the base 1 and a mosquito sticky paper 23 laid on the outer side of at least one plate surface of the lining sheet 21, the outer surface of the mosquito sticky paper 23 is coated with mosquito sticky glue (no shown in figure), the base 1 is also provided with an accommodating cavity 10, one end of the mosquito sticky paper 23 is rolled into a tube shape and accommodated in the accommodating cavity 10, while the opposite end extends along the plate surface of the lining sheet 21 and is fixed to the top end of the lining sheet 21.

This embodiment of present disclosure adopts the lining sheet 21 supported on the base 1 with a roll of mosquito sticky paper 23 to form the mosquito catching sheet 2, by pulling on one end of the mosquito sticky paper 23, the mosquito sticky paper 23 is extended along the plate surface of the lining sheet 21 and fixed to the top of the lining sheet 21. The surface of the mosquito sticky paper 23 exposed to the outside space is coated with the mosquito sticky glue, which can effectively catch mosquitoes, and when the mosquito sticky glue needs to be replaced, the mosquito sticky paper 23 in the accommodating cavity 10 can be reversed by further pulling the mosquito sticky paper 23 to release the unused mosquito sticky paper 23, and then the mosquito sticky paper 23 can be extended and laid out along the plate surface of the lining sheet 21 again and fixed the mosquito sticky paper 23 again, so that the mosquito sticky glue can be replaced. The lining sheet 21 can be reused and the mosquito sticky glue can be quickly replaced, which is economical and environmentally friendly.

Figure 3:
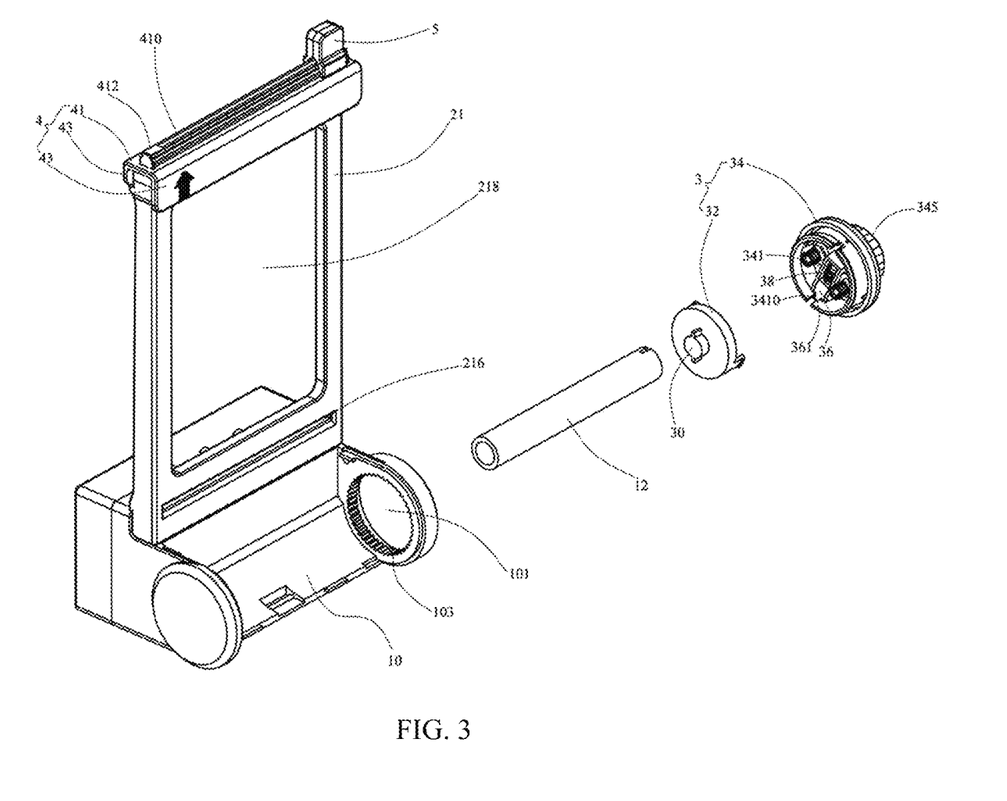
FIG. 3 is an exploded schematic diagram of the mosquito killer according to one embodiment of the present disclosure, where a mosquito sticky paper and a base cover are removed.
Figure 4:
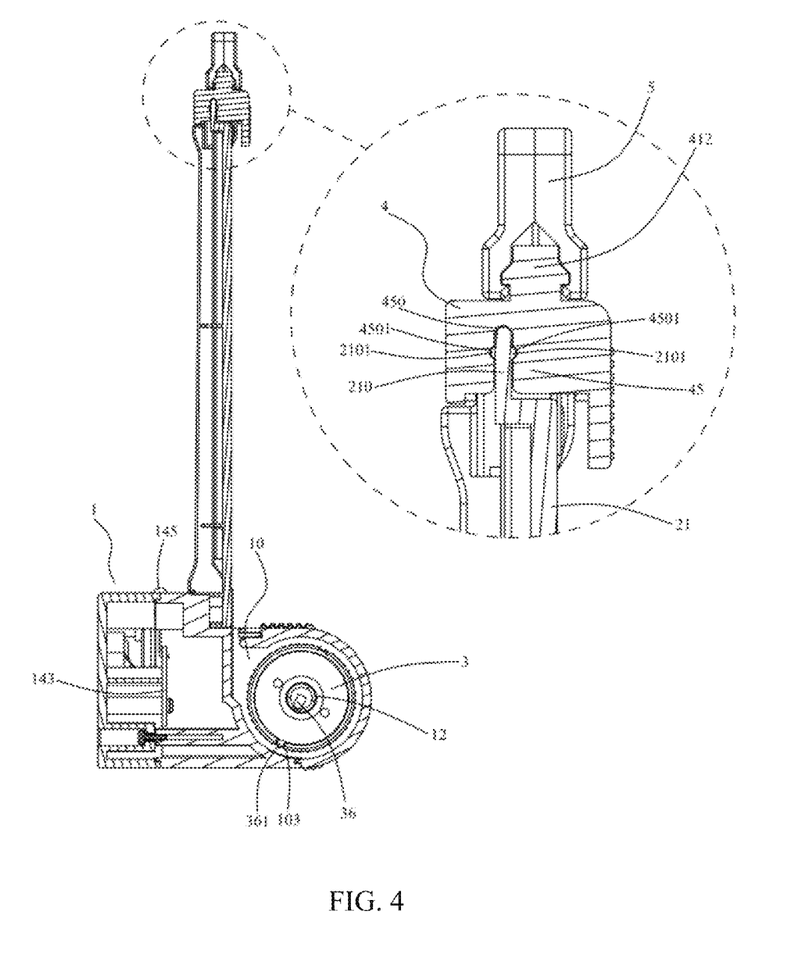
FIG. 4 is a cross-sectional schematic view of the mosquito killer according to one embodiment of the present disclosure, taken along a central axis of a positioning protrusion.
Figure 5:
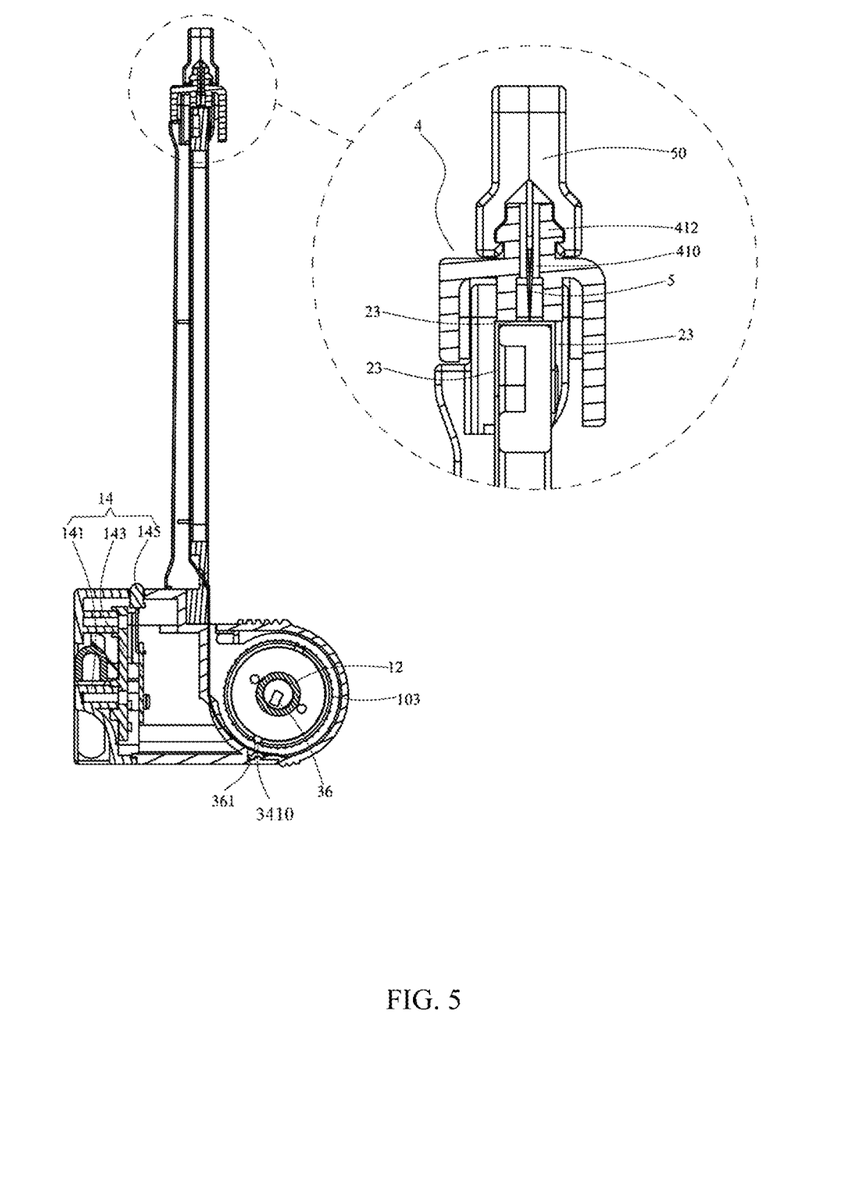
FIG. 5 is a cross-sectional schematic view of the mosquito killer according to one embodiment of the present disclosure, taken along a center of the limiting sheet.

In another embodiment, referring to FIG. 3 to FIG. 5, the accommodating cavity 10 is pivotally provided with a roller 12, one end of the mosquito sticky paper 23 is coiled and fixed on the roller 12, one end of the roller 12 is pivotally connected to the inner wall of the accommodating cavity 10 and the other end is transmission-connected to an operating knob 3, the accommodating cavity 10 corresponding to the operating knob 3 is provided with a pivot hole 101, the operating knob 3 is pivotally connected in the pivot hole 101 and protrudes out of a transmission shaft 30 toward the accommodating cavity 10 to be transmission-connected with the roller 12. In this embodiment, the roller 12 is driven to rotate by the operating knob 3 to guide the mosquito sticky paper 23 to be retracted in a positive roll or released in a negative roll, which is convenient for the user to operate. In the specific implementation process, the transmission connection between the transmission shaft 30 and the roller 12 can be made by means of non-circular cross-section insertion adaptation, or by means of insertion and groove insertion fixation, to achieve relative fixation in the circumferential direction of the transmission shaft 30 and the roller 12 and thus to guarantee the synchronous rotation.

In another embodiment, referring to FIG. 3 to FIG. 5, the inner wall of the pivot hole 101 is provided with tooth grooves 103 along the circumferential direction, the operating knob 3 comprises a side plate 32 and a cover plate 34 fixed by butt-fastening to the side plate 32. The transmission shaft 30 is protrudes from one side of the side plate 32 toward the roller 12. The cover plate 34 is provided with a mounting groove 341 on one side facing the side plate 32, tone end of the mounting groove 341 is provided with an opening 3410, and a clamping block 36 is assembled in the mounting groove 341 accordingly. A clamping tooth 361 is formed on a first end of the clamping block 36, and a second end of the clamping block 36 away from the clamping tooth 361 is elastically connected to the groove wall of the mounting groove 341 through an elastic member 38. The clamping tooth 361 extends to the outside of the cover plate 34 from the opening 3410 and is meshed with the tooth grooves 103 to relatively fix the roller 12 in the circumferential direction. When an external force is applied, the external force drives the clamping tooth 361 to press against the tooth grooves 103 and exerts pressure on the elastic member 38 in the opposite direction, the elastic member 38 is elastically contracted by the force, thereby driving the clamping tooth 361 to withdraw from the tooth grooves 103 and pass over the tooth grooves 103 one by one, thereby driving the roller 12 to rotate. In this embodiment, an elastic member 38 is arranged between the clamping block 36 and the inner wall of the mounting groove 341. The elastic member 38 is used to guide the clamping block 36 to retract when a rotational force is applied to the cover plate 34 from the outside, so that the clamping tooth 361 at the end are withdrawn from the tooth grooves 103 on the inner wall of the pivot hole 101. At this time, the cover plate 34 drives the transmission shaft 30 of the side plate 32 to rotate, and the roller 12 also rotates synchronously to guide the mosquito sticky paper 23 to be retracted in a positive roll or released in a negative roll. In addition, when the external force is withdrawn, the clamping block 36 is reset accordingly, the clamping tooth 361 are correspondingly engaged in the corresponding tooth grooves 103, the operating knob 3 and the roller 12 are fixed accordingly to prevent the roller 12 from rolling uncontrollably and causing the mosquito paper 23 to loosen. It can be understood that the side of the cover plate 34 is provided with the opening 3410 for the clamping tooth 361 to extend out, the cover plate 34 away from the side plate 32 protrudes out of an operating portion 345, which is convenient for gripping and rotating.

In another embodiment, referring to FIG. 1 to FIG. 3 and FIG. 5, the mosquito killer also comprises a fixing strip 4 fixed to the top of the lining sheet 21 away from the base 1, the fixing strip 4 comprises a top plate 41 arranged opposite to the top of the lining sheet 21 and two guard plates 43 extending from both side edges of the top plate 41 toward the base 1, the end of the mosquito sticky paper 23 extends and passes over the top of the lining sheet 21, and the top plate 41 and the guard plates 43 on both sides are respectively pressed and fixed to the mosquito sticky paper 23 from three directions. In this embodiment, the mosquito killer also comprises the fixing strip 4 fixed to the top of the lining sheet 21 away from the base 1, the fixing strip 4 comprises a top plate 41 arranged opposite to the top of the lining sheet 21 and two guard plates 43 extending from both side edges of the top plate 41 toward the base 1, the top plate 41 and the two side guard plates 43 respectively exert a corresponding compression force on the mosquito sticky paper 23, so that the fixing effect is more firm, the mosquito sticky paper 23 is not easy to fall off, and the user's experience is better.

In another embodiment, referring to FIG. 1 to FIG. 7, the top plate 41 is also provided with a sliding groove 410 along its length direction, and a paper cutting blade 5 is slidably connected in the sliding groove 410, the paper cutting blade 5 moves along the sliding groove 410 to cut the mosquito sticky paper 23 accordingly. In this embodiment, the top plate 41 is also provided with the sliding groove 410 along its length direction, and the paper cutting blade 5 is slidably connected in the sliding groove 410, the paper cutting blade 5 moves along the sliding groove 410 to cut the mosquito sticky paper 23 accordingly, which facilitates the timely cleaning off of the used portion of the mosquito sticky paper 23 when replacing the mosquito sticky paper 23. In the specific implementation process, the paper cutting blade 5 also comprises a blade holder 50, and the top surface of the top plate 41 protrudes correspondingly to form a sliding rail 412, the blade holder 50 is provided on the sliding rail 412 and can slide along the sliding rail 412, and the paper cutting blade 5 is driven by the blade holder 50 along the sliding groove 410. It can be understood that the sliding rail 412 only needs to be arranged parallel to the sliding groove 410 to achieve the synchronous movement of the blade holder 50 and the paper cutting blade 5, and the arrangement of the sliding rail 412 and the blade holder 50 can make the movement of the paper cutting blade 5 more stable, but it is not a necessary condition for realizing the function of the paper cutting blade 5. In addition, the width of the sliding groove 410 can be set to be larger than the width of the mosquito sticky paper 23. When the mosquito sticky paper 23 does not need to be cut, the paper cutting blade 5 is correspondingly placed on the side of the sliding groove 410 without contacting the mosquito sticky paper 23.

Figure 1:
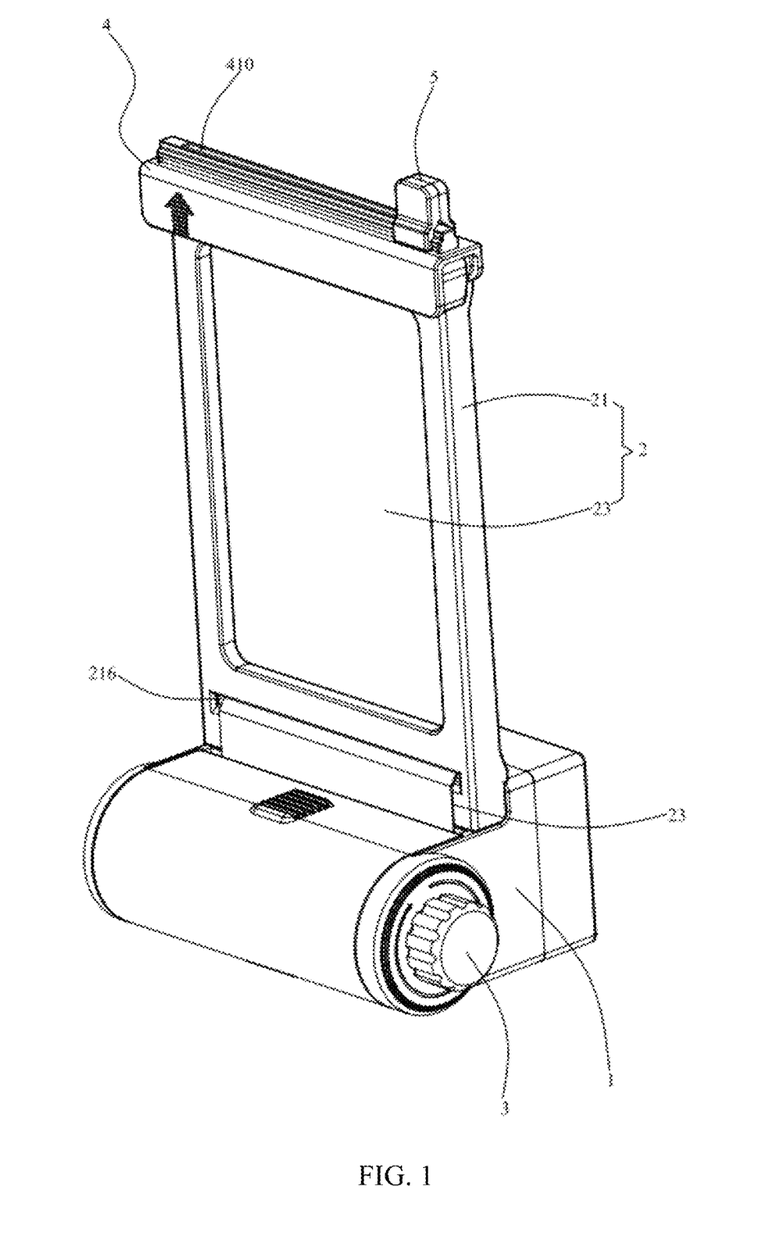
FIG. 1 is a schematic diagram of a mosquito killer according to one embodiment of the present disclosure.
Figure 2:
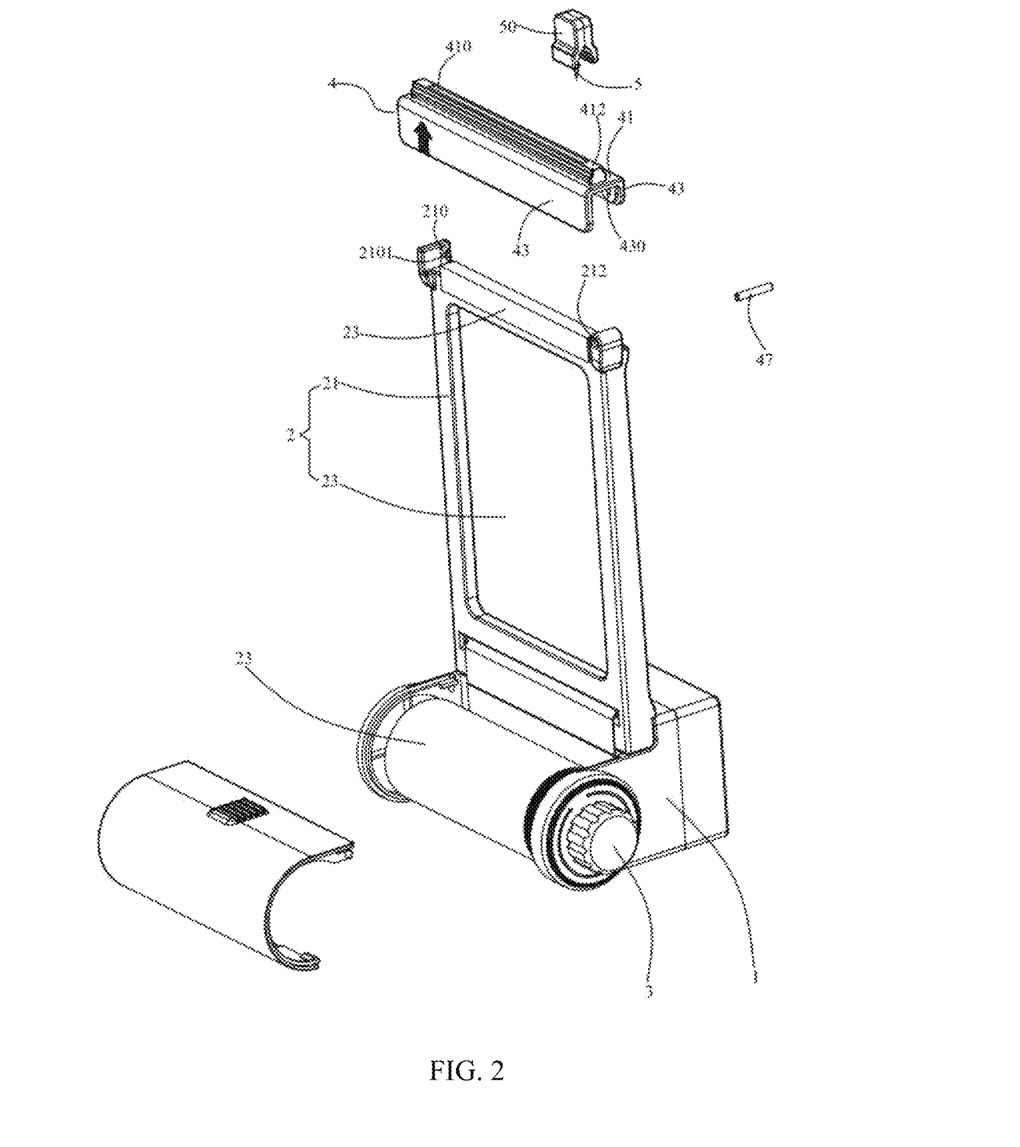
FIG. 2 is an exploded schematic diagram of the mosquito killer according to one embodiment of the present disclosure, where a fixing strip and a lining sheet are separated from the mosquito killer.

In another embodiment, referring to FIG. 2 and FIG. 4, one side of the top end of the lining sheet 21 is provided with a positioning sheet 210, the fixing strip 4 extends out of an end plate 45 corresponding to the positioning sheet 210, the end plate 45 is provided with a positioning clip groove 450 corresponding to the positioning sheet 210, by inserting the positioning sheet 210 into the positioning clip groove 450, the installation position of the fixing strip 4 can be located on the lining sheet 21. In this embodiment, the installation position of the fixing strip 4 is located by inserting the positioning sheet 210 into the positioning clip groove 450, which is relatively simple in structural design and quick in positioning operation.

In another embodiment, referring to FIG. 2 and FIG. 4, the positioning sheet 210 is also provided with a positioning protrusion 2101, the groove wall of the positioning clip groove 450 is correspondingly provided with a positioning hole 4501, by inserting the positioning protrusion 2101 into the positioning hole 4501, the positioning sheet 210 can relatively fix the fixing strip 4 and the lining sheet 21. In this embodiment, the fixing strip 4 and the lining 21 are relatively fixed by cooperating the positioning hole 4501 on the inner wall of the positioning clip groove 450 with the positioning protrusion 2101 on the positioning sheet 210. Compared with the tensioning cooperation between the positioning sheet 210 and the positioning clip groove 450, the fixing effect is more reliable, the effect of preventing the positioning sheet 210 from falling out is better, and the operation is more controllable.

Figure 6:
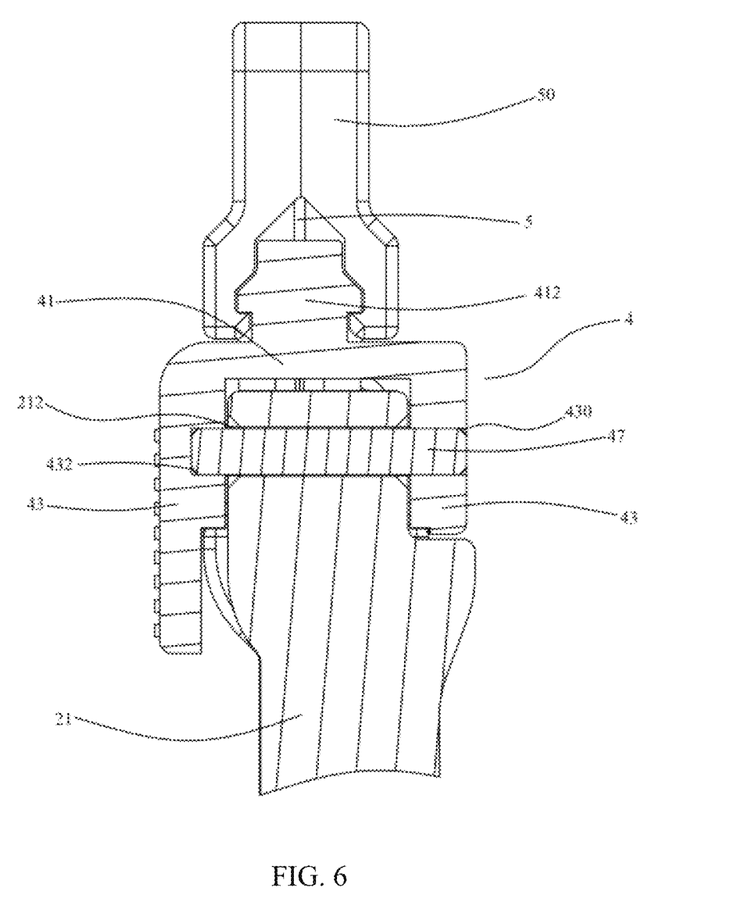
FIG. 6 is a cross-sectional schematic view of the limiting sheet taken along a central axis of a latch.

In another embodiment, referring to FIG. 2 and FIG. 6, the top of the lining sheet 21 away from the positioning sheet 210 is provided with a through hole 212, one of the guard plates 43 on both sides is provided with an alignment hole 430 corresponding to the through hole 212, and the other is provided with a locking hole 432 corresponding to the through hole 212, and a latch 47 passes through the alignment hole 430 and the through hole 212 in sequence and is inserted and fixed into the locking hole 432 to lock the lining sheet 21 and the fixing strip 4. In this embodiment, the latch 47 passes through the alignment hole 430 of the one side of the guard plate 43 and the through hole 212 on the lining sheet 21, and is finally locked in the locking hole 432 of the opposite side of the guard plate 43 to lock the lining sheet 21 and the fixing strip 4, so the fixing effect is firm, and the pressing and fixing effect of the mosquito sticky paper 23 is also more guaranteed, thereby preventing the mosquito sticky paper 23 from loosening and causing inconvenience in use. In a specific implementation process, the locking hole 432 can be set as a screw hole, and the latch 47 is correspondingly screwed and fixed in the locking hole 432.

Figure 7:
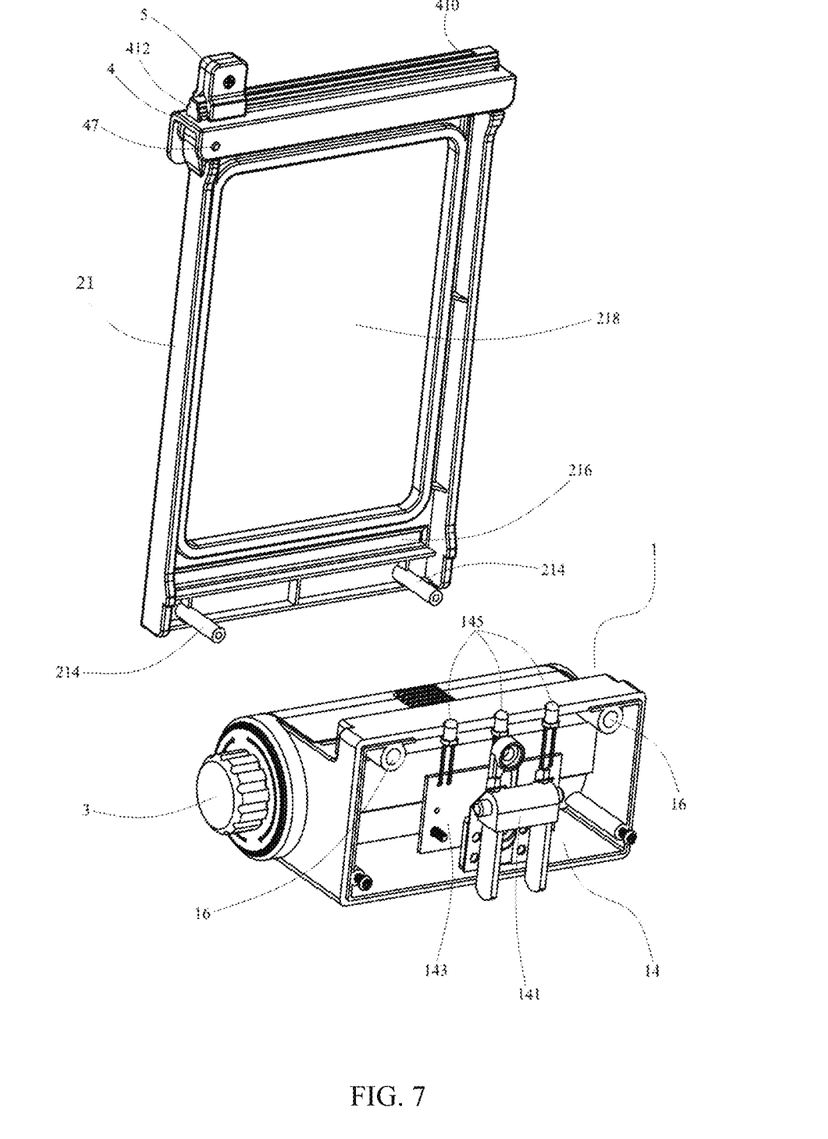
FIG. 7 is an exploded schematic diagram of the mosquito killer according to one embodiment of the present disclosure, where the lining sheet thereof is separated from a base thereof.

In another embodiment, referring to FIG. 2 and FIG. 7, the bottom end of the lining sheet 21 protrudes out from a plug column 214 on the side away from the accommodating cavity 10, the base 1 is provided with a plug hole 16 corresponding to the plug column 214, the lining sheet 21 is supported on the base 1 by inserting the plug column 214 into the plug hole 16, the lining sheet 21 near its bottom end is provided with a long groove hole 216 for the mosquito sticky paper 23 to pass through, and a hollow hole 218 is provided in the middle. In this embodiment, the plug column 214 cooperates with the plug hole 16 to fix the lining sheet 21 and the base 1, which is simple and quick to disassemble and assemble. The lining sheet 21 is provided with a long groove hole 216 near the bottom end for the mosquito sticky paper 23 to pass through, so as to enhance the fixing effect of the mosquito sticky paper 23. When the mosquito sticky paper 23 is stretched, the mosquito sticky paper 23 will not be loosened from the lining sheet 21, and the hollow hole 218 is provided in the middle of the lining sheet 21, which can reduce the self-weight of the lining sheet 21 and the supporting load of the base 1, so that the mosquito sticky sheet 2 can be supported more stably, and the cost of materials and transportation can be reduced.

In another embodiment, referring to FIG. 5 and FIG. 7, the side of the base 1 away from the accommodating cavity 10 is also provided with a light source assembly 14, the light source assembly 14 comprises a power module 141, a control circuit board 143 connected to the power module 141, and a light source 145 assembled on the control circuit board 143. In this embodiment, the light source assembly 14 is provided to attract mosquitoes with light source, thereby enhancing the mosquito killing effect of the mosquito killer; the power module 141 in the light source assembly 14 can be a plug that can be connected to an external power source, the control circuit board 143 can be used to control the lighting mode or timing switch of the light source 145, thereby enhancing the practicality of the mosquito killer.

Above are only preferred embodiments of the present disclosure and are not intended to limit the present disclosure. Any modification, equivalent replacement and improvement made within spirit and principle of the present disclosure should be included in protective scope of the present disclosure.

What is claimed is:

1. A mosquito killer, comprising: a base and a mosquito catching sheet supported on the base, wherein:
the mosquito catching sheet comprises a lining sheet supported on the base and a mosquito sticky paper laid on an outer side of at least one plate surface of the lining sheet, an outer surface of the mosquito sticky paper is coated with mosquito sticky glue, the base is provided with an accommodating cavity, a first end of the mosquito sticky paper is rolled into a tube shape and accommodated in the accommodating cavity, and a second end of the mosquito sticky paper extends along the at least one plate surface of the lining sheet and is fixed to a top end of the lining sheet;
wherein the accommodating cavity is pivotally provided with a roller, the first end of the mosquito sticky paper is fixed on the roller, a first end of the roller is pivotally connected to an inner wall of the accommodating cavity, a second end of the roller is transmission-connected to an operating knob, the accommodating cavity is provided with a pivot hole corresponding to the operating knob, the operating knob is pivotally connected in the pivot hole, and a transmission shaft is protruded from the operating knob toward the accommodating cavity and connected to the second end of the roller, so the operating knob is transmission-connected with the roller;
wherein the mosquito killer comprises a fixing strip fixed to a top of the lining sheet away from the base, the fixing strip comprises a top plate arranged opposite to the top of the lining sheet and two guard plates extending from both side edges of the top plate toward the base, the second end of the mosquito sticky paper extends and passes over the top of the lining sheet, and the top plate and the guard plates on both sides are respectively pressed and fixed to the mosquito sticky paper from three directions;
the top plate is provided with a sliding groove along a length direction thereof, and a paper cutting blade is slidably connected in the sliding groove, the paper cutting blade moves along the sliding groove to cut the mosquito sticky paper accordingly.

2. A mosquito killer, comprising: a base and a mosquito catching sheet supported on the base, wherein:
the mosquito catching sheet comprises a lining sheet supported on the base and a mosquito sticky paper laid on an outer side of at least one plate surface of the lining sheet, an outer surface of the mosquito sticky paper is coated with mosquito sticky glue, the base is provided with an accommodating cavity, a first end of the mosquito sticky paper is rolled into a tube shape and accommodated in the accommodating cavity, and a second end of the mosquito sticky paper extends along the at least one plate surface of the lining sheet and is fixed to a top end of the lining sheet;
wherein the accommodating cavity is pivotally provided with a roller, the first end of the mosquito sticky paper is fixed on the roller, a first end of the roller is pivotally connected to an inner wall of the accommodating cavity, a second end of the roller is transmission-connected to an operating knob, the accommodating cavity is provided with a pivot hole corresponding to the operating knob, the operating knob is pivotally connected in the pivot hole, and a transmission shaft is protruded from the operating knob toward the accommodating cavity and connected to the second end of the roller, so the operating knob is transmission-connected with the roller;
wherein an inner wall of the pivot hole is provided with tooth grooves along a circumferential direction, the operating knob comprises a side plate and a cover plate fixed to the side plate, the transmission shaft is protruded from one side of the side plate toward the roller, the cover plate is provided with a mounting groove on one side facing the side plate, one end of the mounting groove is provided with an opening, and a clamping block with a clamping tooth is assembled in the mounting groove, the clamping tooth is formed at a first end of the clamping block, a second end of the clamping block is elastically connected to a groove wall of the mounting groove through an elastic member, and the clamping tooth extends out of the cover plate from the opening and is meshed with the tooth grooves to relatively fix the roller in the circumferential direction, when an external force is applied to the operating knob, the external force drives the clamping tooth to press against the tooth grooves and exert pressure on the elastic member, the elastic member is elastically contracted by the external force, thereby driving the clamping tooth to withdraw from the tooth grooves and pass over the tooth grooves one by one, thereby driving the roller to rotate.

3. The mosquito killer of claim 1, wherein the mosquito killer comprises a fixing strip fixed to a top of the lining sheet away from the base, the fixing strip comprises a top plate arranged opposite to the top of the lining sheet and two guard plates extending from both side edges of the top plate toward the base, the second end of the mosquito sticky paper extends and passes over the top of the lining sheet, and the top plate and the guard plates on both sides are respectively pressed and fixed to the mosquito sticky paper from three directions.

4. The mosquito killer of claim 3, wherein the top plate is provided with a sliding groove along its length direction, and a paper cutting blade is slidably connected in the sliding groove, the paper cutting blade moves along the sliding groove to cut the mosquito sticky paper accordingly.

5. The mosquito killer of claim 3, wherein one side of the top end of the lining sheet is provided with a positioning sheet, the fixing strip extends out of an end plate corresponding to the positioning sheet extends from the fixing strip, the end plate is provided with a positioning clip groove corresponding to the positioning sheet, by inserting the positioning sheet into the positioning clip groove, an installation position of the fixing strip is enabled to be located on the lining sheet.

6. The mosquito killer of claim 5, wherein the positioning sheet is provided with a positioning protrusion, a groove wall of the positioning clip groove is correspondingly provided with a positioning hole, by inserting the positioning protrusion into the positioning hole, the positioning sheet relatively fixes the fixing strip and the lining sheet.

7. The mosquito killer of claim 5, wherein the top of the lining sheet away from the positioning sheet is provided with a through hole, a first one of the guard plates is provided with an alignment hole corresponding to the through hole, and a second one of the guard plates is provided with a locking hole corresponding to the through hole, and a latch passes through the alignment hole and the through hole in sequence and is inserted and fixed into the locking hole to lock the lining sheet and the fixing strip.

8. The mosquito killer of claim 1, wherein a plug column is protruded from one side of a bottom end of the lining sheet, the base is provided with a plug hole corresponding to the plug column, the lining sheet is supported on the base by inserting the plug column into the plug hole, the lining sheet near its bottom end is provided with a long groove hole for the mosquito sticky paper to pass through, and a hollow hole is provided in a middle of the lining sheet.

9. The mosquito killer of claim 1, wherein one side of the base away from the accommodating cavity is provided with a light source assembly, the light source assembly comprises a power module, a control circuit board connected to the power module and a light source assembled on the control circuit board.

* * * * *